May 25, 1954  J. H. ROBERTS  2,679,391
SPRING SHACKLE ASSEMBLY
Filed Feb. 3, 1953  2 Sheets-Sheet 1

James H. Roberts
INVENTOR.

BY *Clarence A. O'Brien*
and *Harvey B. Jacobson*
Attorneys

May 25, 1954

J. H. ROBERTS 2,679,391

SPRING SHACKLE ASSEMBLY

Filed Feb. 3, 1953

James H. Roberts
INVENTOR.

BY *Clarence A. O'Brien*
*and Harvey B. Jackson*
Attorneys

Patented May 25, 1954

2,679,391

UNITED STATES PATENT OFFICE 2,679,391

SPRING SHACKLE ASSEMBLY

James H. Roberts, Osceola, Ark.

Application February 3, 1953, Serial No. 334,933

8 Claims. (Cl. 267—54)

This invention relates to improvements in spring shackle assemblies particularly designed for use in the suspension of vehicle bodies upon their springs and has for its particular object the provision of means for self adjusting of the assembly.

Another important object of the invention resides in the provision of a spring shackle assembly which is capable of being readily and effectively lubricated so as to eliminate a large proportion of friction.

Another object of the invention resides in the means for readily disassemblying the spring shackle assembly in a rapid and convenient manner, the assembly being specifically adapted to facilitate repairs.

Still further objects of the invention reside in the provision of a spring shackle assembly that is strong, durable, highly efficient in operation, simple in construction and manufacture, capable of being repaired by substitution of one part in a convenient manner, and which is relatively inexpensive to produce.

These together with the various ancillary objects of the invention which will become apparent as the following description proceeds, are attained by this spring shackle assembly, preferred embodiments of which have been illustrated in the accompanying drawings, by way of example only, wherein.

Figure 1:
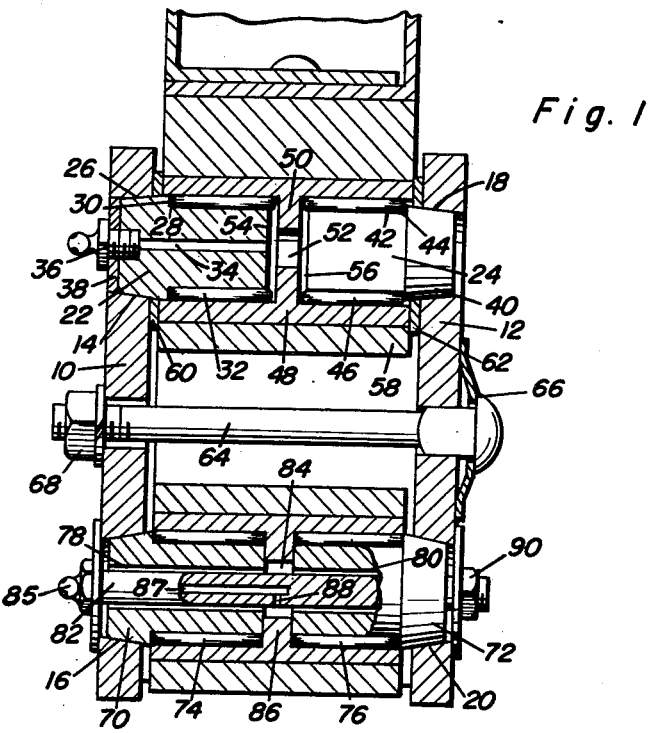
Figure 1 is a sectional view of a first form of the invention which is adapted for use in suspending automobile bodies on their springs.

With continuing reference to the accompanying drawings wherein like reference numerals designate similar parts throughout the various views, and with particular reference to Figure 1, it will be seen that herein is provided a spring shackle assembly including side links 10 and 12. The side link 10 is provided with an upper beveled aperture 14 and a lower beveled aperture 16 while the side link 12 is provided with an upper beveled aperture 18 and a lower beveled aperture 20.

A pair of upper trunnions 22 and 24 are provided. The trunnion 22 has a bearing surface 26 in the shape of a truncated cone. Further, the trunnion 22 is provided with a peripheral recess 28 forming a shoulder 30. Within the recess 28 there is carried a needle bearing cluster 32. A grease passageway 34 extends longitudinally through the trunnion 22 and is adapted to align with a threaded recess in which a grease fitting 36 is threadedly engaged. A retainer plate 38 is carried by the grease fitting 36 and held against the trunnion 22. The trunnion 24 is provided with an outer portion 40 of truncated conical shape and is further provided with a recess 42 forming a shoulder 44. The recess 42 is adapted to receive a cluster of needle bearings 46. The trunnions 22 and 24 are carried within a sleeve member 48 which is tubular in shape and which is provided with a partition wall 50 centrally located therein. The partition wall 50 is provided with a central aperture 52 for permitting passage of grease from the trunnion 22 to the trunnion 24. An arcuate lead 54 for distribution of grease is provided in the trunnion 22 and another arcuate lead 56 is provided for the trunnion 24. The spring as at 58 with which the shackle assembly is associated is emplaced about a sleeve 86.

A resilient pad 60 is positioned between the side plate 10 and the sleeve 48 and another resilient pad 62 is positioned between the side plate 12 and the sleeve 48. A bolt fastener 64 extends between and beyond the side links 10 and 12 and is provided with a resilient plate 66 at the head end. A nut 68 is engaged with the bolt 64 so as to enable the plate 66 to be drawn resiliently against the side link 12 so as to cause the trunnions 22 and 24 to adjust themselves within their respective bearing axis.

Other trunnions as at 70 and 72 are provided which carry needle bearings 74 and 76 respectively in the manner heretofore described. However, these trunnions 70 and 72 are provided with apertures 78 and 80 therethrough in which a bolt fastener 82 extends. The bolt fastener likewise passes through a hole 84 through the sleeve 86. The bolt fastener 82 is adapted to carry a grease fitting 85 and a passageway 87 is provided for distributing the grease to the bearing clusters 74 and 76 through the transverse passageway 88, the hole 84 and suitable annular passageways (not shown) in the trunnion. A nut 90 is provided for holding the bolt fastener 82 in a secure position.

Figure 2:
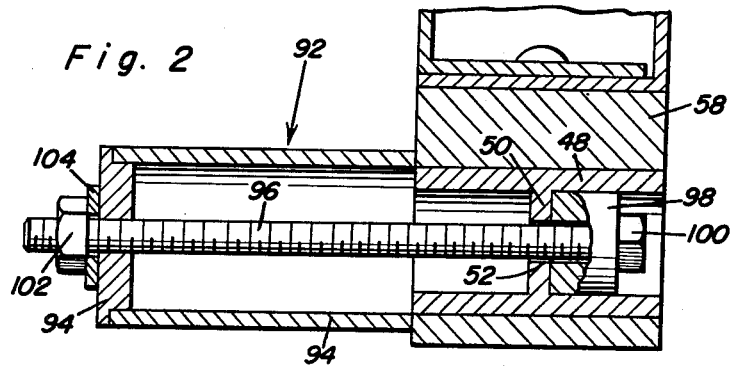
Figure 2 is a vertical sectional view showing the construction of the sleeve puller which comprises a tool used in the disassembly of this device.
Figure 3:
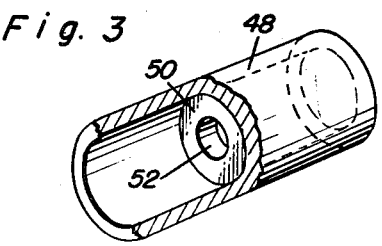
Figure 3 is a perspective view, with parts being broken away to show other parts in greater detail, of the sleeve forming one of the important elements of this spring shackle assembly.

When it is desired to disassemble this spring shackle assembly, it is merely necessary to use the tools generally designated as at 92 in Figure 2. Here there is provided a tubular member 94 which carries a backing plate 94. A threaded rod 96 extends through the backing plate 94 and carries a sliding sleeve 98 which is adapted to engage with the partition wall 50. The threaded rod 96 is headed as at 100 and a nut 102 is provided for directing the sliding sleeve 98 against the partition wall 50. A washer 104 is positioned between the backing plate 94 and the nut 102. Hence, when upon the rotation of the nut 102, the advance of the threaded rod 96 will drive the sleeve 98 against the partition wall 50 and henceforth the sleeve 48 to be removed from engagement with the spring portion 58.

Figure 4:
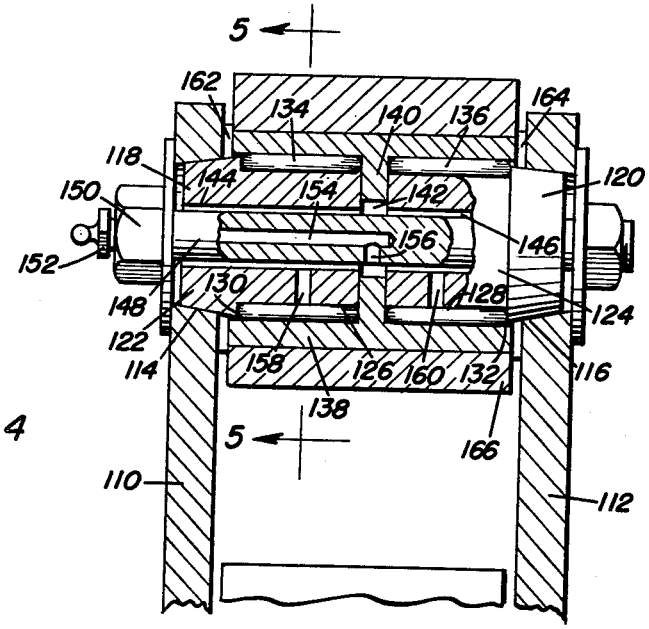
Figure 4 is a sectional view showing the construction of a modified form of the invention especially adapted for heavy service as in suspension of truck and bus bodies and the like, upon their springs.
Figure 5:
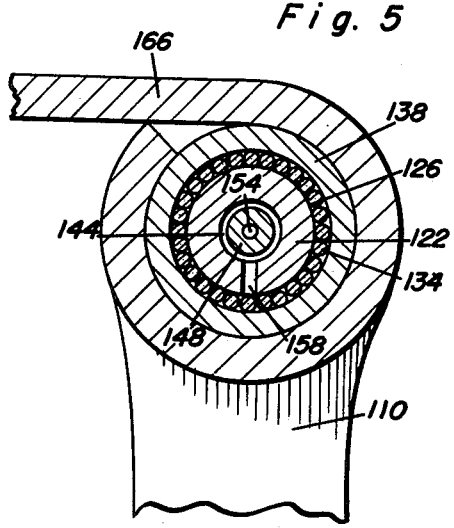
Figure 5 is a vertical sectional view as taken along the plane of line 5—5 of Figure 4.
Figure 6:
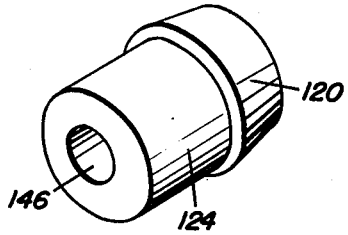
Figure 6 is a perspective view showing the construction of the trunnion forming one of the important elements of the form of the invention as shown in Figure 4.

Referring now to the embodiment as is shown in Figure 4, it will be seen that herein is provided a pair of side links 110 and 112 in which there are suitable bearing apertures 114 and 116 respectively, for receiving the truncated conical ends 118 and 120 of trunnions 122 and 124. The trunnions 122 and 124 are provided with suitable annular recesses 126 and 128 forming shoulders 130 and 132. Received within the recesses 126 and 128 are needle bearing clusters 134 and 136 which are adapted to engage the inner periphery of a sleeve member 138. A central partition wall 140 separates the bearing clusters 134 and 136. The partition wall 140 is provided with a suitable hole 142 therethrough for proper distribution of grease. Extending through apertures 144 and 146 in the trunnions 122 and 124 is a bolt fastener 148 having a head portion 150 provided with a grease fitting 152. A longitudinal passageway 154 is formed in the bolt fastener 148 and a transverse passageway 156 extends between the longitudinal passageway 154 and the hole 142. The grease therefore enters from the grease fitting 152 and is carried to the bearing clusters 134 and 136 through the longitudinal passageway 154, the transverse passageway 156, the hole 142, the holes 144 and 146 and radial passageways 158 and 160 formed in the trunnions 122 and 124. Grease seals comprising resilient pads 162 and 164 which may be formed of cork, felt, or the like are positioned between the side links 110 and 112 and the sleeve 138. The spring 166, of course, embraces the sleeve 138.

As heretofore described, the spring shackle assembly has sufficient means for lubricating the bearing surfaces. Furthermore, a suitable seal for the grease is provided and the shoulders in the trunnions provide means for limiting the end motion of the needle bearing clusters and reducing them to a minimum. Furthermore, these spring shackle assemblies are self adjusting since the truncated conical ends will seat themselves in the beveled apertures in the side plates in a desired manner.

Since from the foregoing, the construction and advantages of these spring shackle assemblies are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claims.

What is claimed as new is as follows:

1. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, and means urging said side links together.

2. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, a grease fitting carried by a first of said trunnions, a lubrication passageway in said first trunnion, and an aperture through said partition wall, and means urging said side links together.

3. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, a grease fitting carried by a first of said trunnions, a lubrication passageway in said first trunnion, and an aperture through said partition wall, a resilient pad between each of said side links and said sleeve, and means urging said side links together.

4. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, a resilient pad between each of said side links and said sleeve, and means urging said side links together.

5. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, a resilient pad between each of said side links and said sleeve, and means urging said side links together, said means comprising a bolt extending through said side links, said trunnions, and said partition wall.

6. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, a resilient pad between each of said side links and said sleeve, and means urging said side links together, said means comprising a bolt extending through said side links, said trunnions, and said partition wall.

7. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, a resilient pad between each of said side links and said sleeve, and means urging said side links together, said means comprising a bolt fastener extending through and between said side links, and a spring plate carried by said bolt engaging one of said side links.

8. A shackle assembly comprising a pair of spaced side links, apertures through said side links, a pair of trunnions, a cylindrical sleeve, said trunnions being received in said sleeve and extending into said apertures, peripheral recesses in said trunnions, clusters of needle bearings concentric with said trunnions in said recesses, and a partition wall in said sleeve separating said clusters, said trunnions having outer portions of truncated conical shape, said apertures in said side links being configurated to provide a bearing engagement with said outer portions of said trunnions, a grease fitting carried by a first of said trunnions, a lubrication passageway in said first trunnion, and an aperture through said partition wall, a resilient pad between each of said side links and said sleeve, and means urging said side links together, said means comprising a bolt fastener extending through and between said side links, and a spring plate carried by said bolt engaging one of said side links.

References Cited in the file of this patent

UNITED STATES PATENTS

| Number | Name | Date |
| --- | --- | --- |
| 1,465,124 | Gardner | Aug. 14, 1923 |
| 1,569,240 | Searles | Jan. 12, 1926 |
| 1,625,344 | Vingheroets | Apr. 19, 1927 |
| 1,872,814 | Riblet | Aug. 23, 1932 |
| 1,908,799 | Tryon | May 16, 1933 |
| 2,333,183 | Jones | Nov. 2, 1943 |

FOREIGN PATENTS

| Number | Country | Date |
| --- | --- | --- |
| 470,110 | Great Britain | Aug. 10, 1937 |